July 30, 1963          E. J. ZEITLIN          3,099,432

VALVE CONSTRUCTION OF THE O-RING POPPET TYPE

Filed July 18, 1960

INVENTOR
EDWARD J. ZEITLIN
BY
Howard J. Jeandron
AGENT

United States Patent Office 3,099,432
Patented July 30, 1963

3,099,432
VALVE CONSTRUCTION OF THE O-RING POPPET TYPE
Edward J. Zeitlin, Applehill, Purdys, N.Y.
Filed July 18, 1960, Ser. No. 43,632
3 Claims. (Cl. 251—324)

This invention relates to the construction of a poppet valve and more particularly to an O ring type poppet valve, in which the O ring is the sealing means and in which the head of the valve is so constructed that it provides a means to bleed fluid past the O ring when the valve is in an open position.

The O ring type poppet valves are old in the art. In many instances with this type of O ring mounted there is a tendency for the fluid back pressure to pop or force the O ring off its mounted position. There have been various attempts to overcome this difficulty, such as drilling a hole through the valve head in back of the seal to relieve back pressure.

It is an object of this invention to provide an O ring type poppet valve in which the valve head is so constructed that there will be leakage through and around the valve when the valve is in an open position and the leakage will be sealed when the O ring has seated itself to close this area.

It is a further object of this invention to provide an O ring type poppet valve in which the valve head is constructed with a hexagonal end with a circular periphery surrounding this end and the O ring mounted so that in the open position of the valve there will be leakage between the hexagonal end and circular portion, while in the closed position the O ring will be forced to seal the open area of the end of the valve.

A still further object of this invention is to provide a poppet type valve using an enlarged O ring, so that when the valve closes, even though the O ring provides a seal, the valve head will move slightly further in an override deforming the O ring while retaining the seal.

Further objects of this invention shall be apparent by reference to the accompanying detailed description and the drawings in which—

Figure 1:
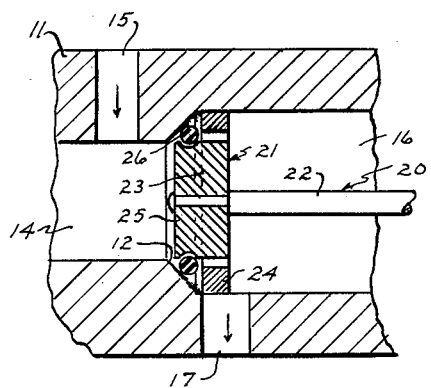
FIGURE 1 is a cross sectional view of a poppet valve shown in an open position.
Figure 2:
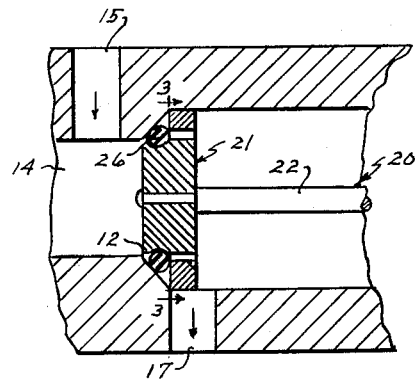
FIGURE 2 is a cross sectional view of the same poppet valve in a closed position.

Referring to the drawings, and particularly FIGS. 1 and 2, there is illustrated a poppet valve, which includes a housing 11, with a valve seat 12 in juxtaposition to the inlet chamber 14, and inlet port 15 and valve chamber 16 with an outlet port 17. A poppet valve 20 is mounted in the chamber 16, poppet valve 20 is comprised of a valve head 21 and a valve stem 22, valve head 21 is circular in form to fit and be reciprocated within chamber 16, valve head 21 is further comprised of a central hexagonal portion with a circular ring mounted about its periphery, the hexagonal portion 23 (FIGURE 3) will be pressed into the outer ring 24, thus providing leakage around the periphery of the hexagonal 23, the hexagonal 23 is also provided with an extended portion 25 having a groove around its periphery to permit the mounting of an O ring 26. It is to be noted that the O ring 26 does not fit tightly within this groove and does not seal the area between the hexagonal element 23 and the ring 24. Thus, in an open position with fluid entering through inlet port 15, the fluid will leak around the O ring through the apertures between elements 23 and 24 and thus equalize the pressure. However, referring to FIG. 2 when valve 20 is pushed to a closed position as illustrated the O ring will then be jammed between the valve seat and elements 23 and 24, sealing these apertures and providing a tight fitting valve.

Figure 4:
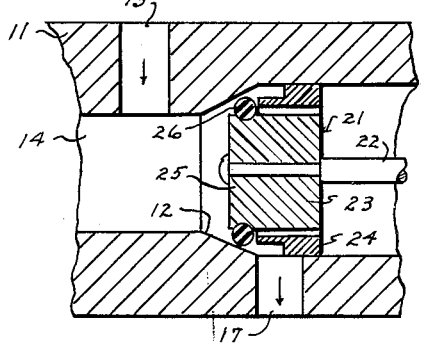
FIGURE 4 is a further embodiment of this invention illustrating a poppet valve with a slightly enlarged O ring showing the valve in an open position.
Figure 5:
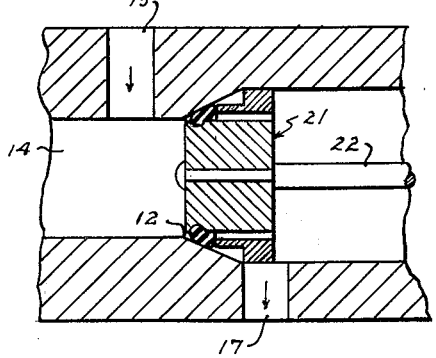
FIGURE 5 is the same poppet valve as in FIGURE 4 shown in closed position.

Referring to FIGS. 4 and 5, there is a further embodiment of this invention in which a similar type O ring poppet valve is illustrated. In this embodiment the O ring 26 must be slightly larger to allow for considerable distortion in a closed position as illustrated in FIG. 5. When the valve stem 22 is pushed to a closed position the O ring will seal against the valve seat 12 but due to the ability of the O ring to distort the valve is permitted to move further to the left, FIG. 5, so that an override is permissible and, of course, when the valve is released the O ring will, due to its distortion, tend to resume its form and thus release the valve from the valve seat 12. Thus, the O-ring performs two functions, one permitting the override of the valve in its movement in closing and, two, assisting the valve to be released from the valve seat when the valve is released for opening.

Although the valve seat 12 has been shown cut in a normal angle in FIGS. 1 and 2, it is to be noted that the angle of the valve seat is slightly changed in FIGS. 4 and 5. The longer angle permits a gentler distorting action on the seal and also permits a longer override motion in the closing of the valve.

Figure 3:
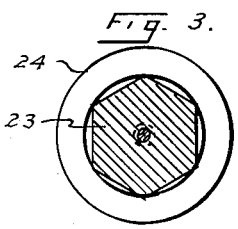
FIGURE 3 is a front elevational view of the valve taken on line 3—3 of FIGURE 2.

Various changes may be made to the type of construction shown here, that is, referring to FIG. 3 although a hexagonal element 23 is shown, other shapes such as a square, triangle, etc. may be used to provide a similar plurality of apertures between elements 23 and 24. Although an O ring seal 26 has been shown as the preferred seal for this type of construction, it is also to be understood that the ordinary flat washer (that is distortable) will also work with this type of construction. Various changes may be made to the construction as shown without departing from the spirit of this invention and this invention shall be limited only by the appended claims.

What I claim is:

1. A valve comprising a body member having a closed cylindrical bore therein, said bore divided into two cylindrical sections of different diameter, an annular beveled valve seat connecting the two different diameter sections, an inlet port connected to the smaller diameter section and an outlet port connected to the larger diameter section, a reciprocable valve mounted in the larger diameter cylindrical section, said valve comprised of a stem and a valve head, said valve head having an annular face of a size to abut with and co-act with said valve seat, said valve head comprised of a central section provided with a plurality of sides and a surrounding ring section and provided with small apertures between the central and ring sections, said central section provided with an extended portion having a recess to support a sealing ring adjacent to and in front of said annular valve face, an O-type sealing ring of resilient material mounted in said recess, said sealing ring being dimensioned to be normally compressed between the annular face of said valve and the beveled valve seat when the valve is closed to establish a seal between said different diameter bore sections, said O-type sealing ring riding in said valve recess during the reciprocating movement of said valve, said O-type sealing ring positioned in said recess to be adjacent to but not sealing said small apertures through said valve head when said valve is in an open position and said O-type sealing ring moving when compressed into a sealing relation with all of the small apertures in said valve head.

2. In a valve according to claim 1 in which the O-type sealing ring is non-compressible but easily distorted under pressure to allow a lateral override movement of the valve after a sealing has been completed and in which the elastic response of the O-type ring will cause it to resume its normal form upon release of pressure to provide a breakaway of the seal when the valve is opened.

3. In a valve according to claim 1 in which the central section partially abuts with said surrounding ring to provide two non-mating parts which provide a plurality of small apertures therethrough.

References Cited in the file of this patent

UNITED STATES PATENTS

| | | |
|---|---|---|
| 2,481,482 | Green | Sept. 13, 1949 |
| 2,490,511 | Courtot | Dec. 6, 1949 |
| 2,542,390 | Brown | Feb. 20, 1951 |
| 2,713,989 | Bryant | July 26, 1955 |